J. GODDARD & W. S. HUTCHINGS.
LENS FRONT FOR CAMERAS.
APPLICATION FILED AUG. 15, 1916.
1,257,842.
Patented Feb. 26, 1918.
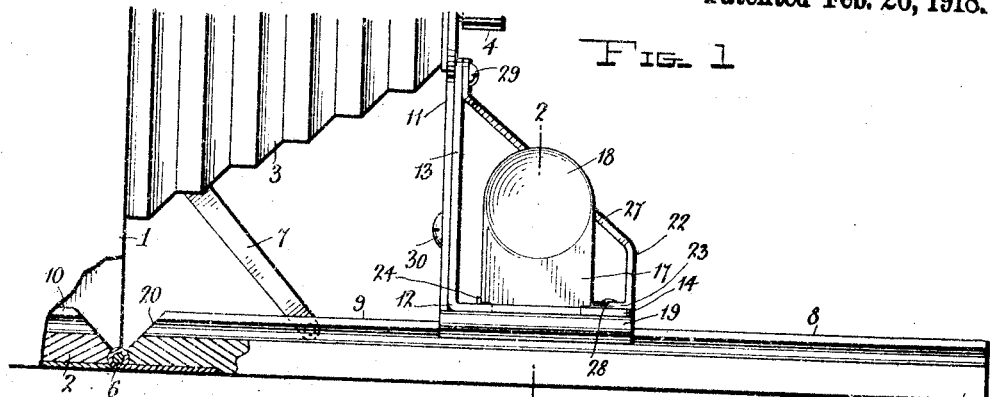
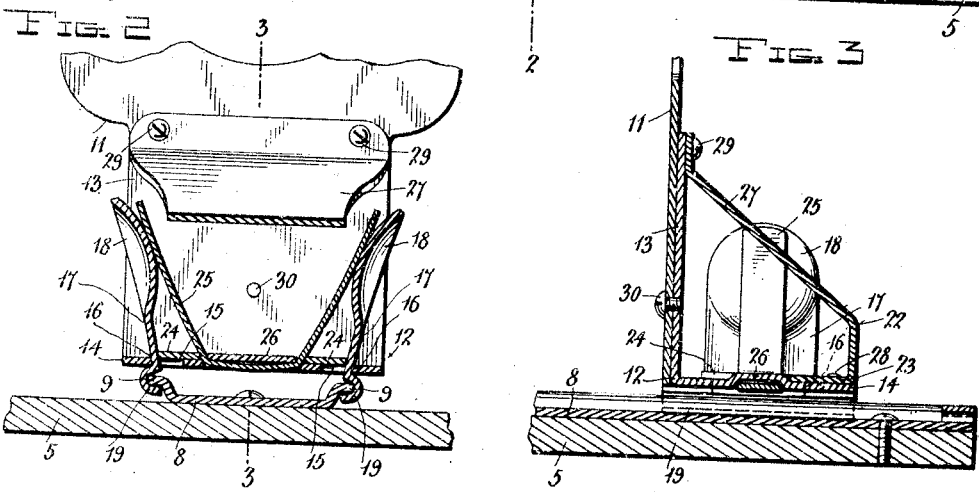
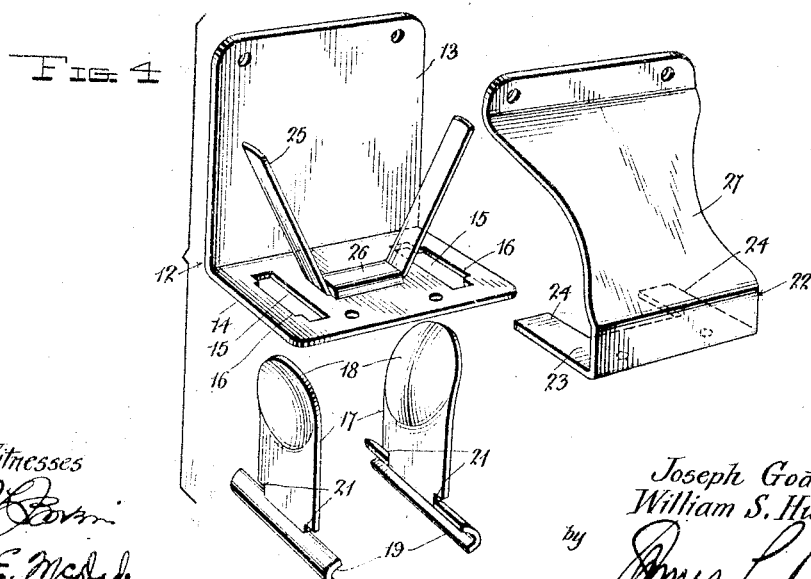
Witnesses
Inventors
Joseph Goddard and
William S. Hutchings,
by
Attorney.

UNITED STATES PATENT OFFICE.

JOSEPH GODDARD AND WILLIAM S. HUTCHINGS, OF ROCHESTER, NEW YORK, ASSIGNORS TO SENECA CAMERA MANUFACTURING COMPANY, OF ROCHESTER, NEW YORK, A CORPORATION OF NEW YORK.

LENS-FRONT FOR CAMERAS.

1,257,842.

Specification of Letters Patent.

Patented Feb. 26, 1918.

Application filed August 15, 1916. Serial No. 115,036.

*To all whom it may concern:*

Be it known that we, JOSEPH GODDARD and WILLIAM S. HUTCHINGS, citizens of the United States, residing at Rochester, in the county of Monroe and State of New York, have invented new and useful Improvements in Lens-Fronts for Cameras, of which the following is a specification.

The present invention relates to improvements in photographic cameras, and more especially to those of the folding focusing type.

The primary object of the invention is to provide an improved lens front for cameras of this type which can be manufactured with facility and at reasonable cost, one which can be manipulated with facility by the user and which, moreover, performs the dual function of clamping the runway or track to hold the lens at different focusing distances from the plate, film or other sensitized medium, and of accurately positioning and firmly holding the lens with its optical axis in correct angular relation to the plane of the sensitized plate or film.

To these and other ends, the invention consists in certain improvements, and combinations and arrangements of parts, all as will be hereinafter more fully described, the novel features being pointed out particularly in the claims at the end of the specification.

In the accompanying drawing:—

Figure 1 is a view, partly in section, of a portion of a camera of the folding focusing type equipped with a lens front constructed in accordance with the present invention.

Fig. 2 represents a section on the line 2—2 of Fig. 1.

Fig. 3 represents a section on the line 3—3 of Fig. 2, and

Fig. 4 is a collective view of the parts composing the base of the lens front and the coöperative members which serve to clamp the lens front in different focusing positions along the track or runway and to guide, position and hold the lens front in correct relation to the sensitized plate or film.

Similar parts are designated by the same reference characters in the several views.

The present invention is applicable generally to cameras of the focusing type, that is to say, those wherein the lens is movable in a direction toward and from the sensitized plate or film in order to focus the camera accurately and to compensate for varying distances of the object from the camera as is well known in this art. The invention is particularly adapted to focusing cameras of the so-called "folding" type, that is to say, a camera wherein the lens front, lens and bellows are housed within a box or body portion of the camera when the same is not in use, the front of the box or casing being then closed by a hinged or movable door and the lens front, lens and bellows are extended relatively to the box or casing when the camera is in use, the lens front, lens and bellows when extended being supported and positioned by the door which is swung or moved into an open or extended position to serve as a bed. A camera of this general type is shown and described in Patent No. 801,078, granted October 3, 1905, and the present invention is an improvement upon the lens front shown and described in that patent.

The preferred embodiment of the invention is shown in the accompanying drawing and will be hereinafter described in detail. It is to be understood, however, that the invention is not limited to the precise construction or arrangement shown, as modifications or changes may be made in the construction and arrangement of the parts, and that constructions equivalent to that shown in the present instance will be included within the scope of the claims.

In the present instance, 1 represents a portion of the box or casing of a camera of the folding focusing type, the bottom 2 of this box or casing providing a relatively short bed, and 3 represents a portion of the bellows which, as usual, is extensible and serves to exclude light from the space between the lens 4 and the sensitized film or plate which is positioned by any suitable or well known means within the box or casing 1. The door 5 in the present instance is hinged at 6 to the bottom edge of the box or casing. This door when folded closes the front of the box or casing, the lens front, lens and bellows being then housed within the box. The door when extended or swung into a horizontal position as shown in Fig. 1 serves as a bed to support the lens front, lens and bellows. Braces 7 of any suitable or well known type may be employed to limit the opening movement of the door and to support the door in proper position when opened. In order to support and guide the lens front, a track or runway 8 of any suitable or known form may be secured to the upper side of the door 5. The track or runway as shown is preferably made of a strip of sheet metal of an approximately channel form secured by screws or otherwise to the upper side of the door, and the outturned longitudinal edges 9 of the track or runway are offset above the upper side of the door and provide guides for the lens front, as will hereinafter appear. A relatively short section 10 of a track which is preferably of the same form as the track on the door is secured on the upper side of the bottom 2 of the box or casing, this short track section being in alinement with the track on the door whereby the lens front may be transferred from one track to the other, preparatory to the folding and unfolding of the camera.

The lens 4 is carried by the lens front, and the forward end of the bellows is secured to and supported by the lens front. The lens front, as shown in the present instance, comprises an upright member 11 composed, preferably, of a sheet of metal and a base member 12 which is also preferably composed of sheet metal having an upright portion 13 which is secured in a manner to be hereinafter described to the upright member 11, and this base member is also provided with a forward extension 14, the forward extension being adapted to occupy a position above, and parallel, or substantially so, with the top of the track.

The present invention provides a pair of clamping members which are so mounted relatively to the forward extension of the lens front that they coöperate with the track to perform not only the function of clamping the lens front in different positions along the length of the track as determined by the different focusing positions of the lens, but they also perform the function of guiding the lens front along the track or runway and accurately positioning and firmly holding the lens front in correct relation to the sensitized plate or film in the camera, whereby accuracy of focus is insured for every exposure. Preferably, and as shown, the forward extension 14 of the lens front is provided with a pair of openings 15, these openings being parallel and elongated in the direction of the length of the track. Each opening is provided near one of its edges (the outer edge in the present instance) with a portion 16 of reduced length. The clamping members 17 which may be duplicates are also preferably made from sheet metal. As shown, the upper portions of these clamping members are concaved or otherwise suitably formed to provide finger pieces 18, and the lower portions of these clamping fingers are appropriately shaped to provide jaws 19 to embrace or coöperate with the longitudinal edges of the track. Where, as in the present instance, the axis or pintle of the hinge 6 for the door is located near or in the plane of the outer side of this door, it is necessary to miter the rear edge of the door and the forward edge of the bottom 2 of the casing, as indicated at 20, and it is also necessary to provide a gap of substantial length between the track 8 on the door and the track section 10 in the bottom of the casing. Inasmuch as the lens front must be transferred across this gap from one track to the other, preparatory to folding or unfolding of the camera, it is preferable to employ jaws 19 on the clamping members which are of a length sufficient to span or bridge the gap between the track sections, thereby facilitating the passage of the lens front over this gap between the tracks. The elongated openings 15 in the forward extension of the lens front enable the clamping members to be introduced into these openings from beneath the extension, irrespective of the length of the track-engaging jaws 19. The clamping members are provided at points above the jaws with undercut portions 21, these undercut portions reducing the width of the clamping members to a dimension which substantially equals the length of the respective reduced portions 16 of the openings. After the clamping members have been introduced into the longer portions of the openings by moving the clamping members upwardly from beneath the lens front extension until the undercut portions 21 of the clamping members are on a level with the plane of the lens front extension, the clamping members are spread apart or moved outwardly, causing them to enter the respective reduced portions 16. Suitable means is provided for retaining the clamping members in these reduced portions 16 of the openings. Preferably, and as shown, a member 22 is provided for this purpose, this member having a base portion 23 which provides a pair of rearwardly extending arms 24 which are adapted to overlie the enlarged portions of the openings 15, the distance between the outer edges of the arms 24 being substantially equal to the distance between the inner sides of the clamping members at the points where the latter pass through the reduced portions 16. By covering the larger portions of the openings 15 by the arms 24, the reduced portions 16 of these openings are uncovered and they provide a pair of narrow parallel slots, the edges of which serve as fulcrums for the clamping members, permitting the latter to pivot or rock in the direction necessary to cause the jaws to clamp and release the track or runway, while the opposite long edges of the slots so confine the clamping members as to prevent twisting thereof.

whereby the jaws are firmly maintained in parallelism and thereby prevent cocking or twisting of the lens front on a vertical axis relatively to the track or runway. The undercut portions of the clamping members form shoulders above these portions, and these shoulders are adapted to overlie the top surface of the lens front extension at the ends of the slots in which the clamping members are fitted, and these shoulders prevent rocking of the upper portion of the lens front in a to-and-fro direction while the clamping members grip the track or runway.

Any suitable means may be provided for actuating the clamping members. Preferably, a spring or equivalent device is provided which causes the jaws of the clamping members to normally grip the track or runway, release of the jaws being effected by manual manipulation. For example, as shown, a spring 25 is provided in the present instance for performing such function. This spring may be arranged in different ways relatively to the clamping members to effect the desired action. As shown, the arms of the spring are arranged to engage and bear outwardly upon the finger pieces 18 of the clamping members, the jaws of the clamping members being caused, in consequence, to move inwardly and into gripping engagement with the longitudinal edges of the track, release of the clamping members relatively to the track being accomplished by pressing together the finger pieces in opposition to the action of the spring. The spring may be secured in position in different ways. As shown, a tongue 26 is struck up from the lens front extension 14 at a point between the slots wherein the clamping members are fitted, and the intermediate portion of the spring is forced beneath the tongue and into the opening in the lens front extension from which the tongue was struck.

In order to increase the rigidity of the lens front extension 14 relatively to the remainder of the lens front, the member 22 may be formed with an upwardly and rearwardly inclined shield 27, the base 23 of the member 22 being secured to the upper side of the lens front extension 14 by screws or equivalent means 28, and the upper end of the shield being secured to the upright portion 13 by screws 29. The upright portion 13 of the lens front base is preferably secured to the upright body portion 11 of the lens front by these same screws 29 and by an additional screw 30. By properly proportioning the distance between the inner edges of the arms 24, these arms may, as shown in Fig. 2, coöperate with the spring 25 immediately beyond the tongue 26 and thereby prevent endwise shifting or displacement of the spring.

The present invention provides a construction which can be made substantially wholly of sheet metal, thus possessing the advantages of reasonable cost in manufacture of the parts and facility of assemblage.

Inasmuch as the clamping members serve not only the purpose of holding the lens front in the different desired positions along the track or runway, but also the important function of guiding, positioning and firmly holding the lens front in correct angular relation to the sensitized film or plate to insure accuracy of focus, the necessity of employing a separate guide on the lens front, a construction which requires careful fitting and is hence expensive, is avoided.

According to the present invention, the track-engaging jaws of the clamping members may be made of any desired or necessary length, and yet the device can be made at no appreciable increase in cost and the ease of assembling the parts is not impaired. By fitting and confining the clamping members in narrow slots formed by putting together the part 14 which has the relatively large openings therein and the part 23 which partially covers and thereby reduces these openings to form the narrow slots, the track-engaging jaws of the clamping members are maintained in parallelism, and the lens front, in consequence thereof, is firmly held from twisting or cocking on a vertical axis relatively to the track.

What is claimed is:—

1. In a photographic camera of the focusing type having a runway, the combination of a lens front, and means for clamping the lens front at different focusing positions along the runway and also positioning and holding the lens front in correct angular relation to the sensitized medium, and embodying a base rigid with the lens front and having an opening therein elongated in a direction longitudinally of the runway, one side of the opening being of less length than the opposite side of the opening, a clamping member having a finger piece insertible through said opening, a portion to fit into that side of the opening which is of less length, and a jaw to coöperate with a longitudinal side of the runway, and a part covering that side of said opening which is of greater length and coöperative with the clamping member to confine it in the side of the opening which is of less length.

2. In a photographic camera of the focusing type having a runway, the combination of a lens front having a base provided with a pair of laterally spaced openings elongated in a direction longitudinally of the runway, each opening being reduced longitudinally at a side thereof, clamping members having finger pieces capable of insertion through the respective openings, intermediate portions to fit in said reduced portions of the openings, and jaws to coöperate with the runway, means for confining the clamping members in the respective reduced portions of said openings, and a spring operative to engage the jaws of the clamping members with the runway.

3. In a photographic camera of the focusing type having a runway, the combination of a lens front, and means for clamping the lens front at different focusing positions along the runway and also positioning and holding the lens front in correct angular relation to the sensitized medium, said means embodying a base rigid with the lens front and having a pair of laterally spaced parallel openings elongated in a direction longitudinally of the runway, each opening having one side of less length than the opposite side, a pair of clamping members having finger pieces capable of being inserted through the respective openings in the base, portions to fit in these sides of the respective openings which are of reduced length, and jaws to coöperate with the runway, and a member secured to said base and covering the sides of the openings which are of greater length to confine the clamping members in those sides of the openings which are of less length.

4. In a photographic camera of the focusing type having a runway, the combination of a lens front having a forward extension at its base, a pair of clamping members extending through and fulcrumed in said extension, said members having jaws beneath the extension to coöperate with the runway and finger pieces above the extension, a spring having portions to coöperate with the clamping members to cause engagement of the jaws thereof with the runway, a retaining tongue extending transversely of the intermediate portion of the spring, and a part secured to the lens front extension and having arms coöperative with the spring at opposite sides of the tongue to prevent endwise displacement of the spring.

5. In a photographic camera of the focusing type having a runway, the combination of a lens front, and means for clamping and positioning the lens front on the runway, comprising a base rigid with the lens front and having a pair of openings therein, a pair of clamping members extending vertically through the respective openings in the base, said clamping members having jaws beneath the base to coöperate with the runway and upstanding finger pieces above the base, a spring operative to cause engagement of the jaws with the runway, a retaining tongue embracing the intermediate portion of the spring, and a part secured to the base and having a pair of arms, the outer sides of which coöperate with the inner sides of the clamping members, and the inner sides of which straddle the intermediate portion of the spring.

6. In a photographic camera of the focusing type having a runway, a lens front adapted to be adjusted longitudinally of such runway, and comprising an upright lens-carrying member and a forwardly extended base member, clamping devices separably fitted to said forwardly directed base member to clamp the lens front to the runway and to position and hold the lens front in definite angular relation thereto, and a member having an upwardly and rearwardly extending portion fixed to the forward portion of said forwardly extended base member and to the upright lens-carrying member, and also having a portion lapping the base member and coöperative with said clamping devices to retain them in operative position.

In testimony whereof we have hereunto set our hands in presence of two subscribing witnesses.

JOSEPH GODDARD.
WILLIAM S. HUTCHINGS.

Witnesses:
 MARGARET WUEST,
 RAYMOND SULLIVAN.

Copies of this patent may be obtained for five cents each, by addressing the "Commissioner of Patents, Washington, D. C."